(12) United States Patent
Whitman et al.

(10) Patent No.: US 8,762,310 B2
(45) Date of Patent: Jun. 24, 2014

(54) EVALUATING RECOMMENDATIONS (75) Inventors: Ronald M. Whitman, Seattle, WA (US); Wesley M. Turner, Seattle, WA (US); Jin Y. Yi, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 13/587,764

(22) Filed: Aug. 16, 2012

(65) Prior Publication Data

US 2012/0317067 A1 Dec. 13, 2012

Related U.S. Application Data

(62) Division of application No. 12/058,625, filed on Mar. 28, 2008, now Pat. No. 8,250,012.

(60) Provisional application No. 60/909,312, filed on Mar. 30, 2007.

(51) Int. Cl.
*G06F 17/00* (2006.01)

(52) U.S. Cl.
USPC .................................................. 706/45

(58) Field of Classification Search
USPC ............. 706/12, 20, 45, 62; 705/14.4, 14.41
See application file for complete search history.

(56) References Cited

U.S. PATENT DOCUMENTS

| | | | |
|---|---|---|---|
| 5,842,199 A | 11/1998 | Miller et al. | |
| 5,867,799 A | 2/1999 | Lang et al. | |
| 7,370,004 B1 | 5/2008 | Patel et al. | |
| 2002/0184131 A1* | 12/2002 | Gatto | 705/36 |
| 2004/0230440 A1 | 11/2004 | Malhotra | |
| 2004/0260574 A1* | 12/2004 | Gross | 705/1 |
| 2005/0002561 A1 | 1/2005 | Monachino et al. | |
| 2005/0149383 A1 | 7/2005 | Zacharia et al. | |
| 2006/0074769 A1 | 4/2006 | Looney et al. | |
| 2006/0143236 A1 | 6/2006 | Wu | |
| 2006/0200435 A1* | 9/2006 | Flinn et al. | 706/12 |
| 2006/0212442 A1 | 9/2006 | Conrad et al. | |
| 2006/0271281 A1* | 11/2006 | Ahn et al. | 701/208 |
| 2007/0078832 A1 | 4/2007 | Ott, IV et al. | |
| 2007/0143172 A1* | 6/2007 | Bhagchandani et al. | 705/10 |
| 2007/0225997 A1 | 9/2007 | Haberman et al. | |
| 2008/0228587 A1* | 9/2008 | Slaney et al. | 705/26 |
| 2009/0006286 A1 | 1/2009 | Angell et al. | |
| 2009/0055759 A1 | 2/2009 | Svendsen | |
| 2010/0070554 A1* | 3/2010 | Richardson et al. | 709/202 |
| 2011/0196865 A1 | 8/2011 | Eggink et al. | |

OTHER PUBLICATIONS

Ng, Cheuk-Fan, Satisfying shoppers psychological needs: From public market to cyber-mall, Journal of Environmental Psychology, 23(2003):439-455, 2002.

* cited by examiner

*Primary Examiner* — David Vincent
(74) *Attorney, Agent, or Firm* — Knobbe, Martens, Olson & Bear, LLP (57) ABSTRACT

Generally described, embodiments of the present disclosure are directed toward the identification of items for inclusion in a recommendations list that may be displayed concurrently with an item selected by a user or users. The recommended items may be items that are of potential interest to the user and/or may be items that are related to the selected item. More specifically, embodiments of the present disclosure provide a method and system for generating one or more recommendations lists, providing those lists to users, evaluating users' interactions with those lists, and modifying the engines or techniques used to identify items that are to be included in the recommendations lists.

24 Claims, 7 Drawing Sheets

FIGURE 1

*(KNOWN ART)*

EVALUATING RECOMMENDATIONS

CROSS-REFERENCE TO RELATED APPLICATIONS

This application is a divisional of U.S. patent application Ser. No. 12/058,625, entitled "EVALUATING RECOMMENDATIONS BY DETERMINING USER ACTIONS, AND PERFORMANCE VALUES PERTAINING TO LISTS OF RECOMMENDATIONS," and filed Mar. 28, 2008, which claims the benefit of U.S. Provisional Patent Application No. 60/909,312, entitled "RECOMMENDATION LIST EVALUATION," and filed Mar. 30, 2007, the entirety of which are incorporated herein by reference.

BACKGROUND

Recommendation components or engines are primarily used by electronic commerce sites to suggest products and services to their customers and to provide users with information to help them decide which products or services to purchase. Most often, the products and services recommended are based on purchase or browse histories, or item compatibility.

One feature of electronic commerce with which customers are familiar and upon which vendors have increasingly come to rely is a recommendations component or engine as part of the display of content. Recommendation components or engines attempt to identify, or otherwise present, items that will elicit a desired behavior for a user. For example, when a customer selects an item to view or purchase, the hosting electronic commerce site provides a list of recommendations of alternative and/or complimentary items that the customer may also wish to purchase. In this example, the desired activity can include the additional selection of the items presented for purchase, the selection of the item for review, the generation of awareness about an item (via selection or display on the screen), and the like.

Recommendation components or engines can operate in a manner to accept a set of inputs (e.g., one or more inputs), process the inputs and then generate an output of recommendations in a manner that can be consumed. The set of inputs can include a customer's prior purchases and purchase tendencies, information about items (e.g., product categories, genres, types), community information (e.g., consumer ratings, other consumer purchases, consumer feedback), and the like. Accordingly, recommendation results can differ among recommendation components or engines based on factors such as the number and type of inputs that are inputted into the engine or component. Additionally, the recommendation results can also differ among recommendation components or engines as how certain inputs are processing (e.g., the recommendation engine). As such, content providers often review and modify recommendation components or engines for the purposes of improving effectiveness (e.g., eliciting the desired behavior).

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Specific embodiments of the disclosure will now be described with reference to the drawings. The terminology used in the description presented herein is not intended to be interpreted in any limited or restrictive manner, simply because it is being utilized in conjunction with a detailed description of certain specific embodiments of the disclosure.

Embodiments of the present disclosure relates to a system and method of evaluating engines of recommendation engines or components. In one embodiment, the engines used by the recommendation system are compared head-to-head to evaluate their success of eliciting an action from a user. In one aspect, the set of input values utilized by two recommendation engines or components can be evaluated. For example, the outputs of two recommendation engines or component implementing identical engines, but with different set of inputs, may be compared to evaluate their relative success in eliciting an action from a user. Various methodologies may be used to evaluate such a determination of success. In another aspect, the outputs of two recommendation engines or components implementing similar engines with different modifiable sets of characteristics (such as weights) or altogether differing engines may also be compared head-to-head to evaluate their relative success in eliciting action from a user. In both the above-described aspects, the head-to-head comparison may be conducted across a large number of individuals and over a wide variety of inputs.

In another embodiment, additional feedback mechanisms may be incorporated based on, at least in part, the results of the head-to-head comparisons. In one example, modifications may be made to a test recommendation engine or component. The modifications may include the incorporation of attributes/characteristics from a control recommendation engine or component. The modifications may also include the adjustment of sets of inputs of the test recommendation engine or component based on the perceived performance relative to a control recommendation engine or component. In another example, a recommendation engine or component may be selected based on the results of the head-to-head comparison. In still a further example, the results of the head-to-head comparison may be attributed to the data (e.g., associating a staleness factor to certain input data) and/or utilized in processing additional business logic associated with the underlying data.

Figure 1:
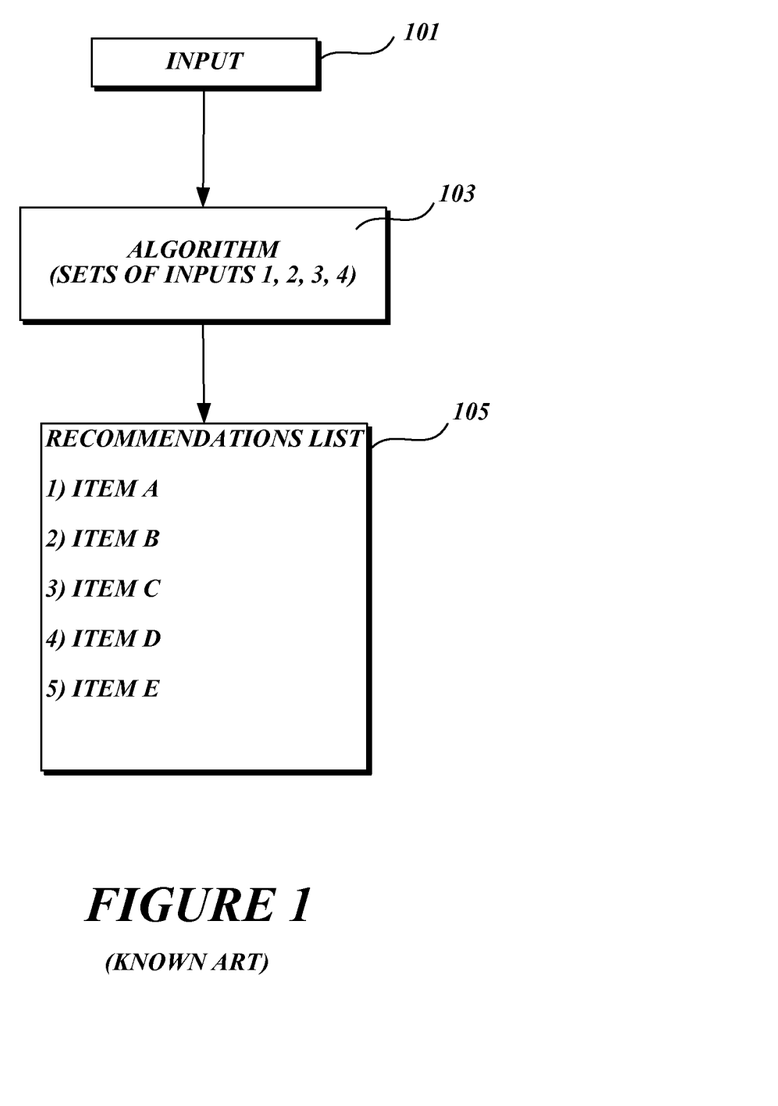
FIG. 1 is a block diagram illustrating the generation of a set of recommendations as a function of an input.

FIG. 1 is a block diagram illustrating how a recommendations list may be generated from an input 101. Generally described, a recommendation engine 103 obtains the input 101. The input may correspond to value or other data for use in compiling a recommendations list or a set of recommendations. For example, the set of inputs may be the user's prior purchase tendencies, what other users have purchased when purchasing the input 101, items that are complimentary to the input 101, items that have been viewed by other users that purchased the input 101, user profiles, item profiles, etc. Based on processing the input, the recommendation engine 103 generates a recommendations list 105 that includes other items that may be of interest to a user that is viewing input 101.

Figure 2:
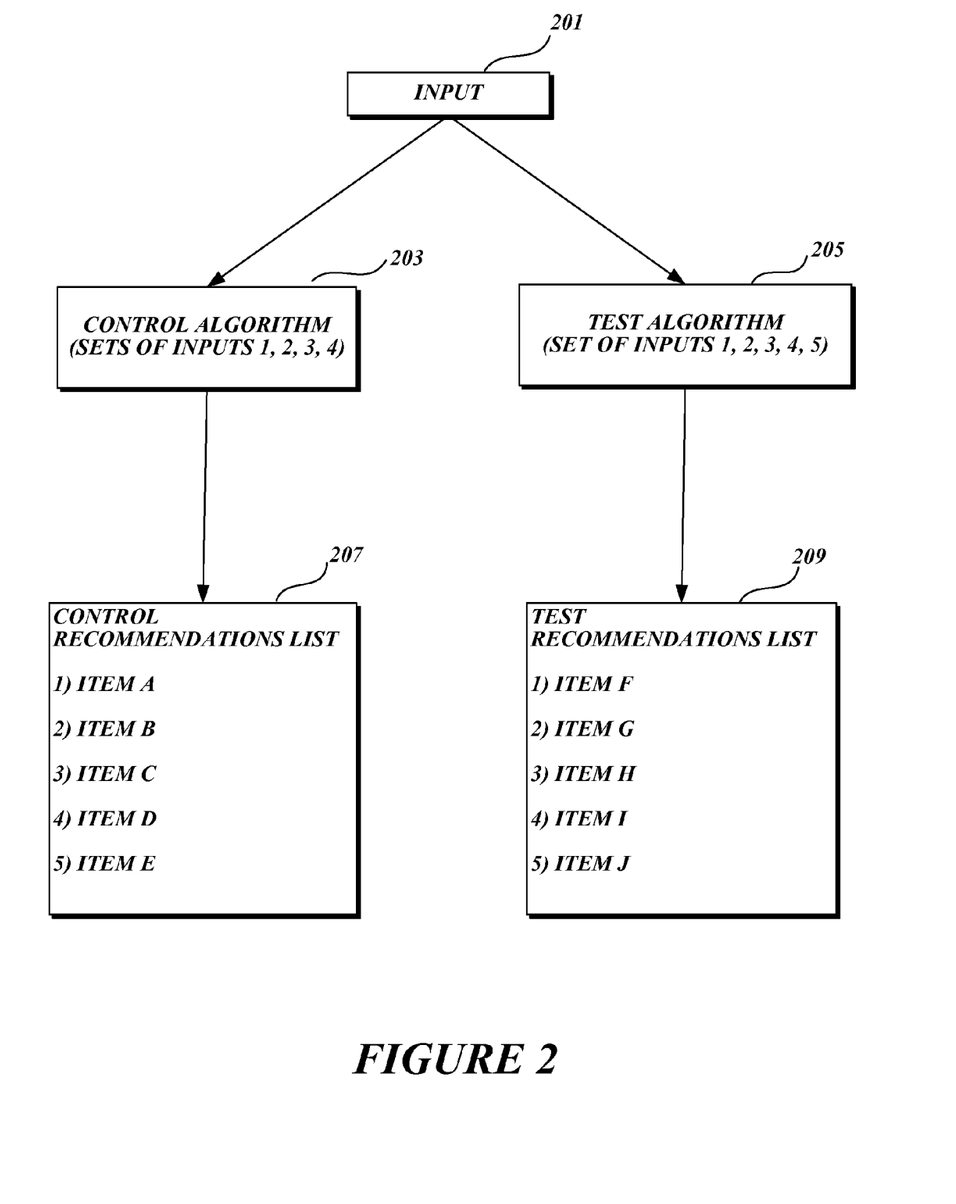
FIG. 2 is a block diagram illustrating the generation of multiple recommendation lists, in accordance with one or more embodiments.

In accordance with an illustrative embodiment, additional comparisons and/or feedback mechanisms may be implemented to improve the performance of recommendation engines or components (as defined in eliciting specific user action). In one example, FIG. 2 is a block diagram illustrating the generation of multiple recommendation lists for an item. As will be described in greater detail below, the generation of multiple recommendation lists can be used to evaluate the engine implemented by a recommendation engine to identify items for inclusion in a recommendations list. While the embodiments described below refer to the use of an engine and a set of inputs to identify items for inclusion in a recommendations list, embodiments may be utilized with any type of technique/process and/or set of inputs that identifies items for inclusion in a recommendations list. Accordingly, the use of the term "engine" and "set of inputs" are provided for assisting in the understanding of one or more embodiments and are not to be construed as limiting. Additionally, the use of the term "engine" may correspond to stand alone software components, network-based services, integrated components, and the like. Moreover, although FIG. 2 will be described with regard to a comparison of two recommendation engines for a single set of inputs, one skilled in the relevant art will appreciate that additional numbers of recommendation engines may be included in the comparison and that a comparison between two or more recommendation engines may be across multiple sets of inputs.

In an illustrative embodiment, the recommendation engines may be based on collaborative filtering, the process of filtering for information or patterns using techniques involving relationships among multiple data sources. Additionally, the recommendation engines may be based on cluster modeling, the partitioning of a data set into subsets (clusters), so that the data in each subset share some common trait—often proximity according to some defined distance measure. Also, the recommendation engines may be based on content filtering, a technique whereby content is blocked or allowed based on analysis of its content, rather than its source or other criteria. Moreover, item-to-item collaborative filtering, a technique used to combine different users' opinions and tastes in order to achieve personalized recommendations. There are at least two classes of collaborative filtering: user-based techniques are derived from similarity measures between users and item-based techniques compare the ratings given by different users. Such engine techniques may employ proximity functions, relevance functions, similarity function, and nearness functions to provide recommendations. In one embodiment, the engines used for the control engine and test engine may be the same, but the set of inputs may vary.

Generally described, one technique for determining the appropriateness of an engine (such as any of those described above) that is used to generate a recommendations list for an input 201 is to utilize one or more test engines, such as test engine 205, a control engine 203. The test engine 205 may include a set of inputs that are different than the set of inputs of control engine 203. For example, control engine 203 may include four sets of inputs 1, 2, 3, 4, whereas the test engine 205 may include each of the same sets of inputs as control engine 203, and also include an additional test set of inputs, such as input 5. Alternatively, the test engine 205 may include a fewer number of inputs than control engine 203. In embodiments that utilize multiple test engines, each test engine, and/or the control engine may vary in input or processing from each other and from the control engine. One or more test engines and/or the control engine may be the same, but with varying sets of inputs. For example, the control engine 203 may be a user based collaborative filtering of items purchased by the same user. In an illustrative embodiment, the test recommendation engine 205 may implement the same engine (i.e., user based collaborative filtering). However, as illustrated in FIG. 2, the output of the test recommendation engine 205 and control recommendation engine 203 will differ as a function of different sets of inputs. For example, the first four inputs utilized by both recommendation engines 203, 205 can correspond to items browsed or selected for purchase, while the fifth additional input utilized by the test recommendation engine 205 can correspond to an additional item in user profile, such as items included in a "wishlist."

In generating a recommendations list for the input 201, each recommendation engine may be used to generate separate recommendation lists. Based on a comparison of assessed performance (to be described in greater detail below), the "better performing" recommendation engine may be selected or otherwise designated. For example, control engine 203 may be used to generate a control recommendations list 207 that includes one set of items, such as item A, item B, item C, item D, and item E. In contrast, the test engine 205 may be used to generate a test recommendations list 209 that includes one or more different items, such as item F, item G, item H, item I, and item J. While the example illustrated in FIG. 2 shows each recommendations list referencing different items, it will be appreciated that each list may reference one or more of the same items. For example, both the control recommendations list 207 and the test recommendations list 209 may reference the same item. Additionally, any number of test recommendation lists (based on providing a set of inputs to the test engine 205 and control engine 203) may be generated such that the determination of performance is based on a cumulative review of performance.

As will be described in more detail below, a user may be associated with a control group or a test group at a time when the user accesses content, such as accessing a Web site provided by a content provider or otherwise interfacing with a network resource provided by the content provider. Depending on whether the user is associated with the control group or the test group, the content provider will provide a corresponding recommendations list from the control engine 203 or the test engine 205. If there are multiple test engines, and thus, multiple test recommendation lists, there may likewise be multiple test groups, one for each test recommendations list. Alternatively, the multiple test engines could by provided at random to the members of a single test group.

As users provide input 201 and are provided the different recommendation lists 207, 209, evaluation and monitoring of the use of those lists may be performed to determine which engine, control engine 203 or test engine 205, is more accurate in generating recommendations for input 201. For example, actions by users in the control group that are provided with the control recommendations list 207 may be evaluated to determine how many users select an item from control recommendations list 207 for viewing and how many users select an item from control recommendations list 207 for purchase. Generally described, embodiments evaluate user interactions with different recommendation lists to identify desirable interactions with those recommendations lists. Desirable interactions may be explicit or implicit. Examples of desirable explicit interactions include, but are not limited to, selection of an item from a recommendations list for viewing, selection of an item from the recommendations list for purchase, purchase of an item from a recommendations list, rating of item in the recommendations list, etc. Examples of implicit interactions include, but are not limited to, a number of pages views of a page including an item from the recommendation lists, time spend viewing a page including an item from the recommendations list, etc.

In yet other embodiments, data from explicit and implicit interactions are given weight considerations. Implicit item page view data may be given one fifth the weight of an explicit item purchase data. Moreover, the weight given an explicit or implicit data value may be variable for example. Weighted factors may be described in relations to profit margins of the items being accessed, a time of day of the user interaction (e.g., business hours versus personal hours), or other external factors associated with user or customer interactions. The weighting of user interactions may vary based on frequency or type of the interaction. In yet other embodiments, the explicit and/or implicit data values may be normalized. The evaluation of recommendation lists may be collected on a regular or automated basis. For example, evaluation data may be collected in an approximate real-time basis or alternatively, on a scheduled basis (e.g., daily, weekly, or a monthly). Although the interactions described above may be considered "positive feedback," "negative" interactions or feedback with respect to the generated recommendation lists may also be considered.

As users in the control group select items for viewing and/or purchase, each elicited action is recorded and processed. For example, a credit value, by means of a counter, may be applied for each action elicited from a recommendations list. Positive credits value may be indicative of any one of a set of desired actions. Additionally, different credit values may be associated with different defined types of actions. For example, the purchase of a recommended item from the recommendation list may correspond to a highest level of credit value, while browsing an item from the recommendation list will correspond to a lower credit value. Still further, credit value to a recommendation engine may be also be decremented if a negative interaction with the recommendations list is experienced. For example, this may occur when a user ignored a resultant recommendations list and elects an alternative option not provided by the engine.

Similarly, as users of the test group are provided with a test recommendations list, such as test recommendations list 209, those users' interaction with the test recommendations list 209 is evaluated and a credit value is applied to the test engine 205 based on the evaluated interactions. After a period of time has elapsed, the credit value applied to the control engine 203 and the credit value applied to the test engine 205 may be compared to determine which engine resulted in a higher instance of desirable interactions with items provided on the recommendations list that is provided with the initially viewed input 201. Based on that comparison, a determination may be made as to which engine 203, 205 is more accurate in generating appropriate recommendation lists for input 201. Once a more accurate engine is determined, it is then optionally selected for further use or used in making operations decisions.

While a credit value has been used to describe a technique for evaluating and comparing engines, it will be appreciated that any manner of evaluation or scoring may be used to compare engines without departing from the spirit and scope of the present disclosure.

Figure 3:
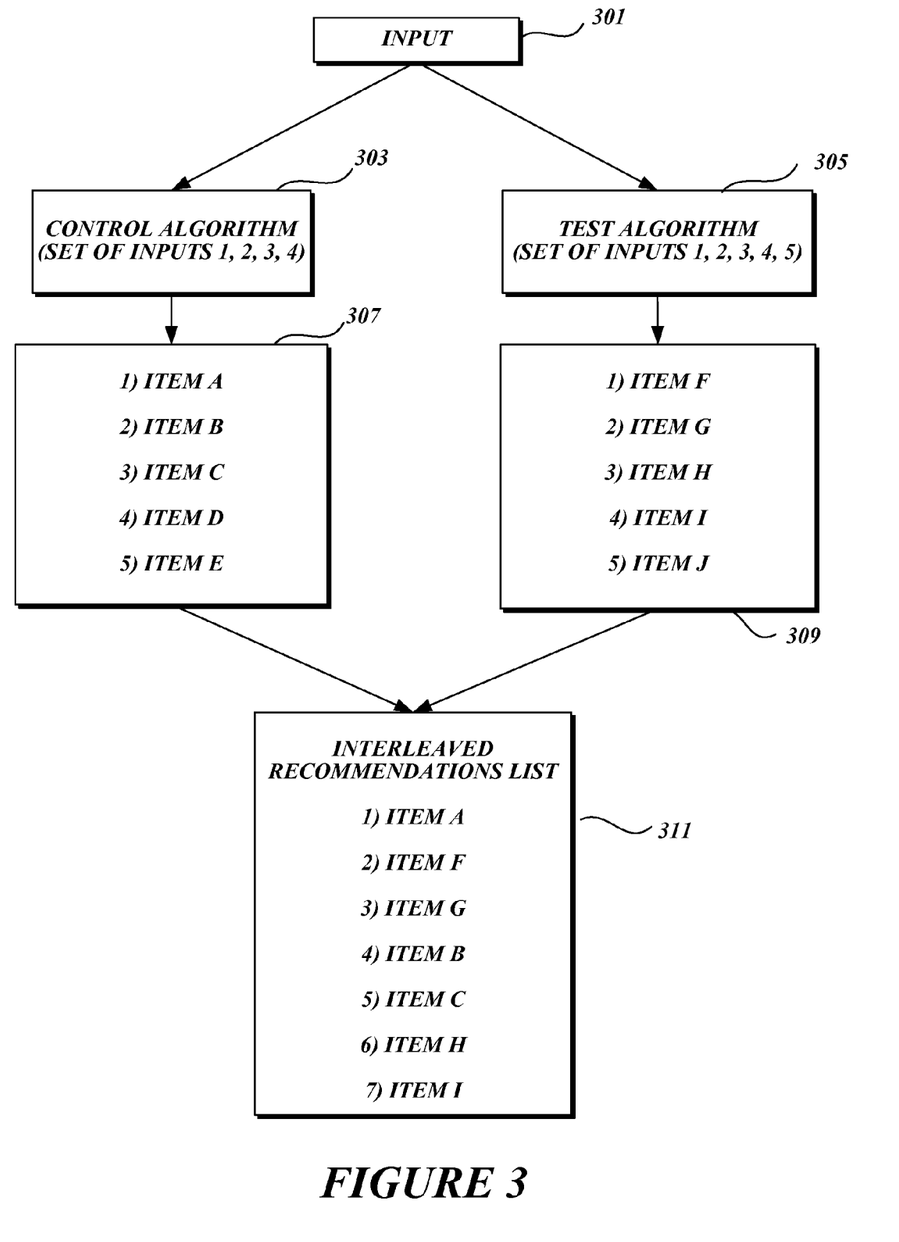
FIG. 3 is a block diagram illustrating the generation of an interleaved recommendations list for use in evaluating an engine that is used to identify items for inclusion in a recommendations list, in accordance with one or more embodiments.

FIG. 3 is a block diagram illustrating the generation of an interleaved recommendations list 311 for use in evaluating an engine that is used to identify items for inclusion in a recommendations list, in accordance with one or more embodiments. Similar to the description above with respect to FIG. 2, one embodiment utilizes a control engine 303 and one or more test engines, such as test engine 305, each having one or more different sets of inputs having pre-defined, prioritized or randomized placement, to identify lists 307, 309 for inclusion in a recommendations list. However, in contrast to utilizing a control group of users and one or more test groups of users, an interleaved recommendations list 311 may be compiled based off the lists 307, 309 identified by the control engine 303 and the test engine(s), such as test engine 305. Accordingly, the interleaved recommendations list 311 may be generated from interleaving at least two lists. The interleaved recommendations list 311 may then be provided to all users as a recommendations list of items related to input 301. Furthermore, the interleaved recommendations list 311 may be based on ranking of confidence values or randomization of confidence values associated with items retrieved from lists 307, 309.

As described below, as users selects from the items presented by the interleaved recommendations list 311, a credit value may be applied to the engine that was used to identify the item selected by the user. In one example, instead of generating a static interleaved recommendations list 311 that includes items identified by control engine 303 and test engine 305 in a static arrangement, multiple interleaved recommendations lists may be generated in which the interleaved items are arranged in a different order. Order typically signifies priority or relevance. If so, an interleaved recommendations list 311 may be ordered by global confidence values. Alternatively, an interleaved recommendations list 311 may be randomly generated from the items identified by the control engine 303 and the test engine 305 when a user selects an input 301 for viewing.

Utilization of an interleaved recommendations list 311 provides the ability to evaluate activity by a single user viewing items identified by different engines to determine which engine is identifying more accurate items as recommendations. In addition, by arranging the items in different orders when viewed by different users, through random generation or multiple interleaved lists, the likelihood of an engine being scored higher simply because items identified by that engine are positioned higher in the interleaved list 311 is reduced.

Figure 4:
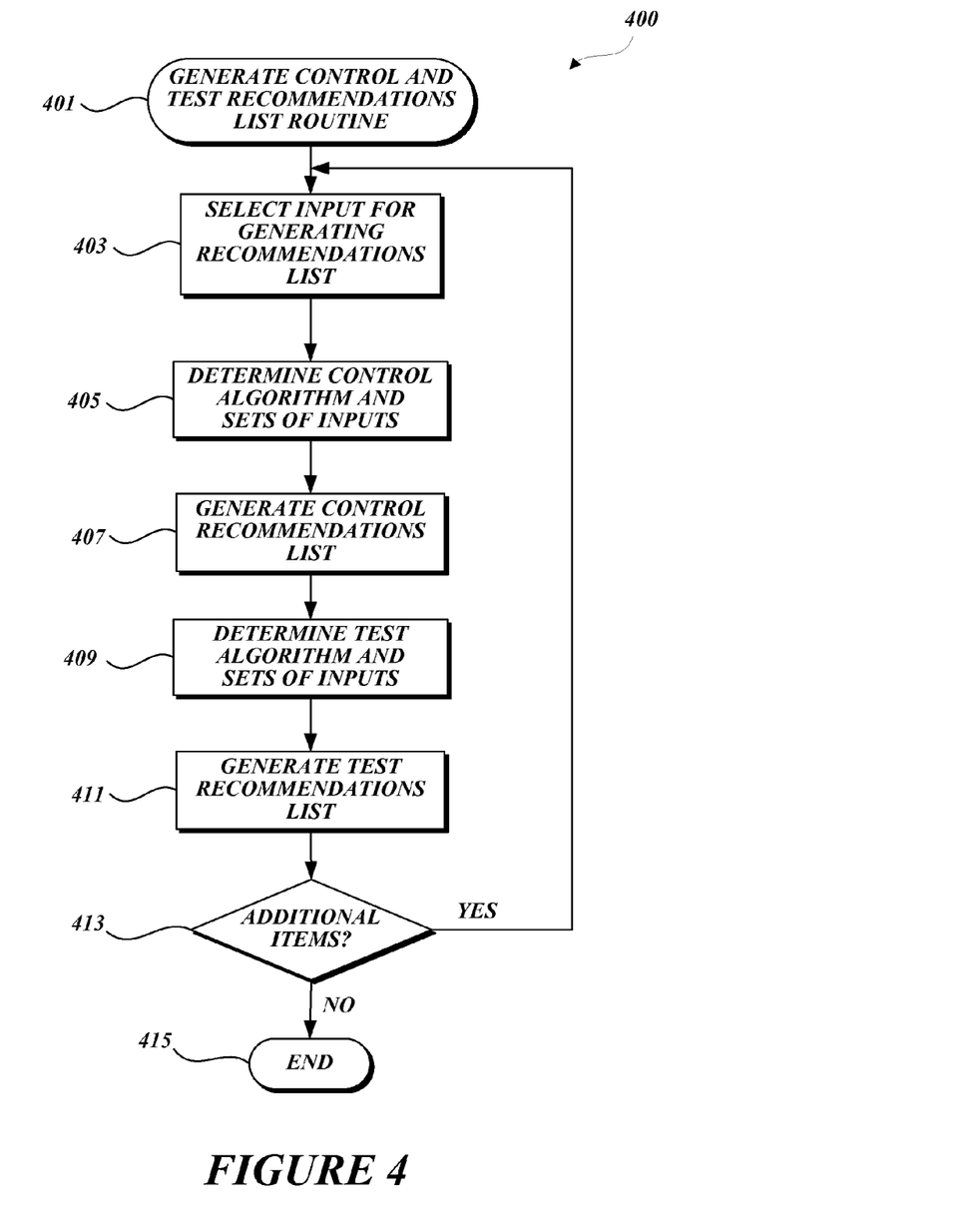
FIG. 4 is a flow diagram illustrating a routine for generating control and test recommendation lists in accordance with one or more embodiments.

FIG. 4 is a flow diagram illustrating a routine for generating control and test recommendations lists in accordance with one or more embodiments. The control and test recommendations list generation routine 400 begins at block 401. At block 403, an input for which a recommendations list is to be generated is selected. In one example, a recommendations list may be generated for at least one item in a catalog on a nightly or periodic basis. Alternatively, recommendations list may be generated on-the-fly as a user selects an item for viewing. At block 405, a control engine and sets of inputs are selected for use in generating a control recommendations list, as illustrated by block 407.

At block 409, a test engine and sets of inputs are determined for use in generating a test recommendations list for the item selected in block 403. Both the control engine and test engine may use identical engine technique, but with differing sets of inputs. At block 411, a test recommendations list is generated based on the test engine and sets of inputs determined at block 409. In an alternative embodiment, any number of test engines and resulting test recommendations lists may be utilized in place of control engines and resulting control recommendations lists.

At decision block 413, a determination is made as to whether there are additional items for which recommendations lists are to be generated. If it is determined at decision block 413 that there are additional items for which recommendations lists are to be generated, the routine 400 returns to block 403 and continues. However, if it is determined at decision block 413 that there are no additional items for which recommendations lists are to be generated, the routine 400 completes, as illustrated by block 415. In an illustrative embodiment, a large number of recommendation lists may be generated to facilitate comparison data covering the recommendation lists (as opposed to comparison of a single list). Accordingly, routine 400, as facilitated through decision block 413, may be repeated to generated the multiple lists based on differing sets of inputs.

Figure 5:
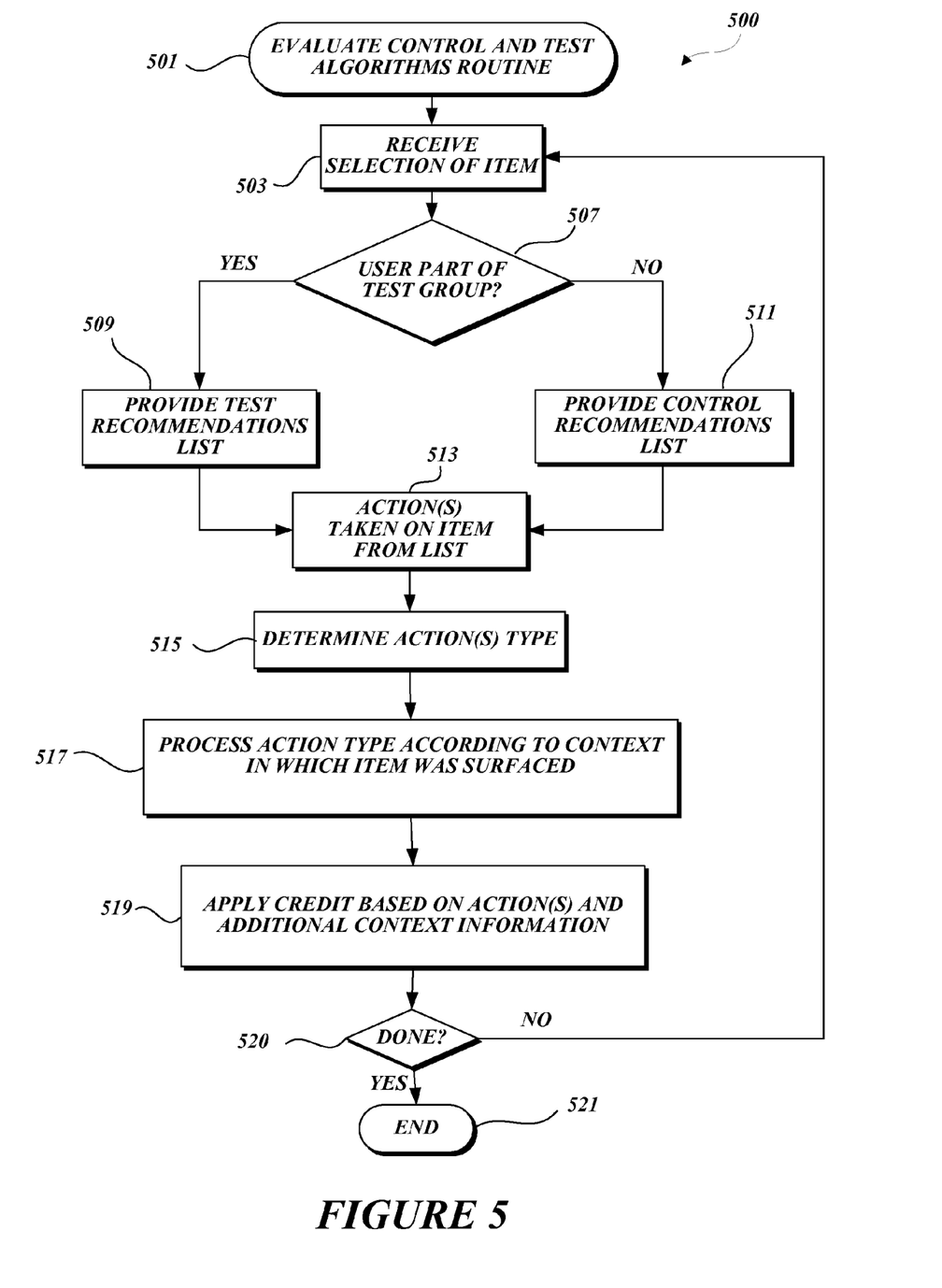
FIG. 5 is a flow diagram illustrating a routine for evaluating control and test recommendation engines in accordance with one or more embodiments.

FIG. 5 is a flow diagram illustrating a routine for evaluating control and test engines in accordance with one or more embodiments of the present disclosure. The control and test engine evaluation routine 500 begins at block 501, and at block 503, a selection of an item is received from a user. At decision block 507, a determination is made as to whether the user selecting the item at block 503 is part of a test group. If it is determined at decision block 507 that the user is part of a test group, at block 509, the test recommendations list is provided to the user along with the item selected at block 503. Alternatively, if it is determined at decision block 507 that the user is not part of a test group, at block 511, the control recommendations list is provided to a user along with the item selected at block 503. In an illustrative embodiment, the determination of whether the user is part of a test group or a control can be based on specific user identity, random selection, session identifier, on an identifier associated with an item, or combination thereof. If there are multiple test recommendations lists, each list may correspond to a respective test group. Alternatively, a test recommendations list may be selected, e.g., randomly, and provided to individuals in a single test group.

At block 513, a determination is made as to whether an action or actions are taken with respect to one of the items identified in the provided recommendations list. Examples of actions that may be taken with respect to an item include, but are not limited to, selecting the item for viewing, placing the item in a cart for purchase, purchasing the item, providing a comment regarding the item, etc. In still a further embodiment, no action or no relevant action can be associated with the item as well (e.g., no consumer activity was elicited).

At block 515 the type of action(s) taken is determined. At block 517, additional processing is applied to the action received. In one embodiment, the additional processing is based on determining whether the item upon which an action(s) have been taken was first surfaced to the user via the recommendations list provided at block 511 or block 509. For example, the processing can determine whether there was a likelihood that the item was selected because it was presented to the user by another feature in the Web page. In another embodiment, additional weighting factors (such as time adjustments) may be associated, or otherwise applied, to the selected action.

Based on the type of action(s) taken, and as filtered at block 517, at block 519 a credit value is applied to the engine that generated the provided recommendations list. As described above, in an illustrative embodiment, the credit value may correspond to a positive value associated with the detected action. The positive value may dynamically applied (based on a range of possible values) or have a fixed value. In another embodiment, one or more credit values may have a negative value such that it would reduce a cumulative credit value associated with the performance of a recommendation list.

The credit value may be any type of scoring or other indication that can be subsequently used to compare the two or more engines to determine which identifies more appropriate items as recommendations. Additionally, the credit value may be of a varying amount based on the types and/or numbers of actions taken with respect to the item, based on a time duration from providing the item in the list and action(s) taken, based on whether the item was first surfaced to the user via the recommendations list, and the like.

For example, an engine may receive a higher credit value for an item that was first surfaced via the list, selected for viewing and purchased within a short period of time, as compared to an item that was first surfaced via the list, selected for purchase, removed from a purchase list, and then several hours later again selected for purchase and purchased. In contrast, an engine may receive less credit, not less than zero, for actions taken with respect to an item that was not first surfaced by the list. As will be appreciated by one of skill in the art, credit value may be simply applied each time an action occurs or may be based on sophisticated analysis of multiple actions and/or events.

At block 520 it is determined whether additional comparisons of recommendation engine remain to be conducted. If so, the routine 500 is iterated once more beginning at block 503. However, if it is determined that the credit computation is complete, then the routine completes, as illustrated by block 521. One skilled in the relevant will appreciate that a head-to-head comparison may correspond to the presentation of the same two recommendations lists to a large set of users. Additionally, a head-to-head comparison may also corresponds to the presentation of different lists based differing inputs. Accordingly, routine 500 can be reiterated to collect a cumulative credit score for performance of the recommendation lists over both aspects.

Figure 6:
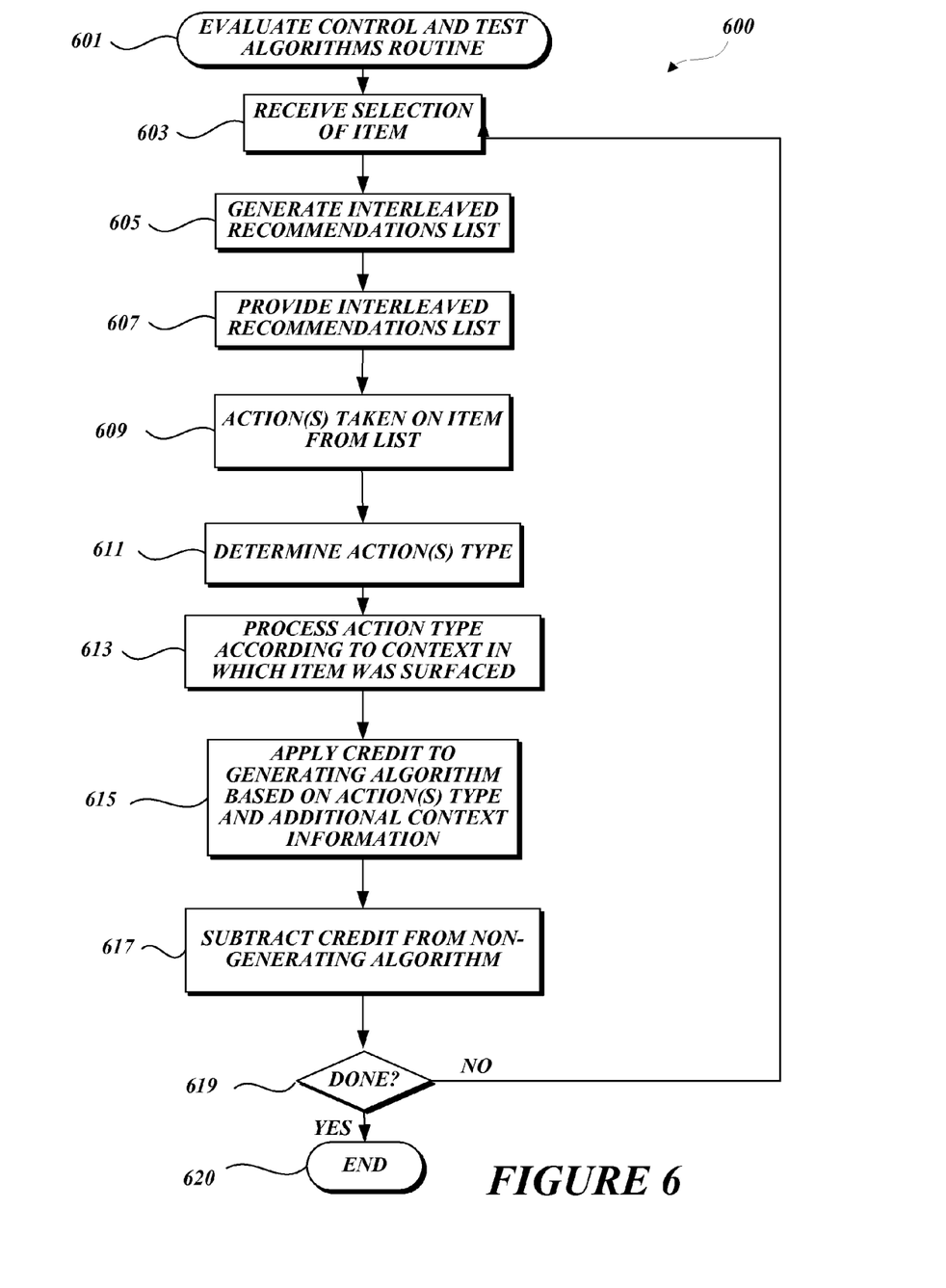
FIG. 6 is a flow diagram illustrating a control and test engines evaluation routine for use in evaluating control and test engines in accordance with one or more embodiments.

FIG. 6 is a flow diagram illustrating a control and test engines evaluation routine for use in evaluating control and test engines in accordance with one or more embodiments. The control and test engines evaluation routine 600 begins at block 601, and at block 603 a selection of an item is received from a user. At block 605, an interleaved recommendations list may be generated and, at block 607, provided to the user. As discussed above, one or more interleaved recommendations lists may be statically generated at predetermined times (e.g., nightly), and provided to a user upon selection of an item at block 603. If multiple interleaved recommendations lists have been generated, one list may be selected and provided to the user. Alternatively, as discussed above, an interleaved recommendations list may be randomly generated or generated on-the-fly, and provided to a user, as illustrated by blocks 605 and 607.

At decision block 609, a determination is made as to whether an action or actions are taken with respect to one of the items in the provided recommendations list. As discussed above, examples of actions that may be taken with respect to an item include, but are not limited to, selecting the item for viewing, placing the item in a cart for purchase, purchasing the item, providing a comment regarding the item, etc. If it is determined at decision block 609 that an action(s) have been taken with respect to one of the items in the provided recommendations list, at block 611 the type of action(s) taken is determined. At block 613 additional processing is applied to the action received. In one embodiment, the additional processing is based on determining whether the item upon which an action(s) have been taken was first surfaced to the user via the recommendations list provided at block 607. For example, the processing can determine whether there was a likelihood that the item was selected because it was presented to the user by another feature in the Web page. In another embodiment, additional weighting factors (such as time adjustments) may be associated, or otherwise applied, to the selected action Based on the type of action or actions taken on an item and whether the selected item was first surfaced by the interleaved recommendations list, at block 615 a credit value is applied to the engine that identified that item upon which the action(s) were taken. Similar to FIG. 5, the credit value may be any type of scoring or other indication that can be used to compare engines to determine which engine identifies more appropriate items as recommendations. Additionally, the credit value may be of a varying amount based on the types and/or numbers of actions taken with respect to the item, based on a time duration from providing the item in the list and action(s), based on whether the item was first surfaced to the user via the list, and the like.

For example, an engine may receive a higher credit value for an item that was first surfaced via the list and selected for viewing and purchased within a short period of time, as compared to an item that was first surfaced via the list, selected for purchased, removed from a purchase list, and then several hours later again selected for purchase and purchased. In contrast, an engine may receive no credit value for actions taken with respect to an item that was not first surfaced by the list. As will be appreciated by one of skill in the art, credit value may be simply applied each time an action occurs or may be based on sophisticated analysis of multiple actions and events.

If the item selected for viewing was identified by both the control engine and the test engine, either both engines may be provided with a credit value, neither engine may be provided with a credit value because both engines accurately identified the selected item, or a credit value may be applied based on a ranking of the item by the generating engines. For example, as recommendations are identified by the engines, they may be ranked with respect to each other identifying which ones that engine believes to be the most relevant. If only one of the engines identified the selected item, in addition to applying a credit value to the engine that identified the item, at block 617, a credit value may be subtracted from the engine that did not identify the selected item.

At block 619 it is determined whether additional comparisons of recommendation engine remain to be conducted. If so, the routine 600 is iterated once more beginning at block 603. However, if it is determined that the credit computation is complete, then the routine completes, as illustrated by block 620.

Figure 7:
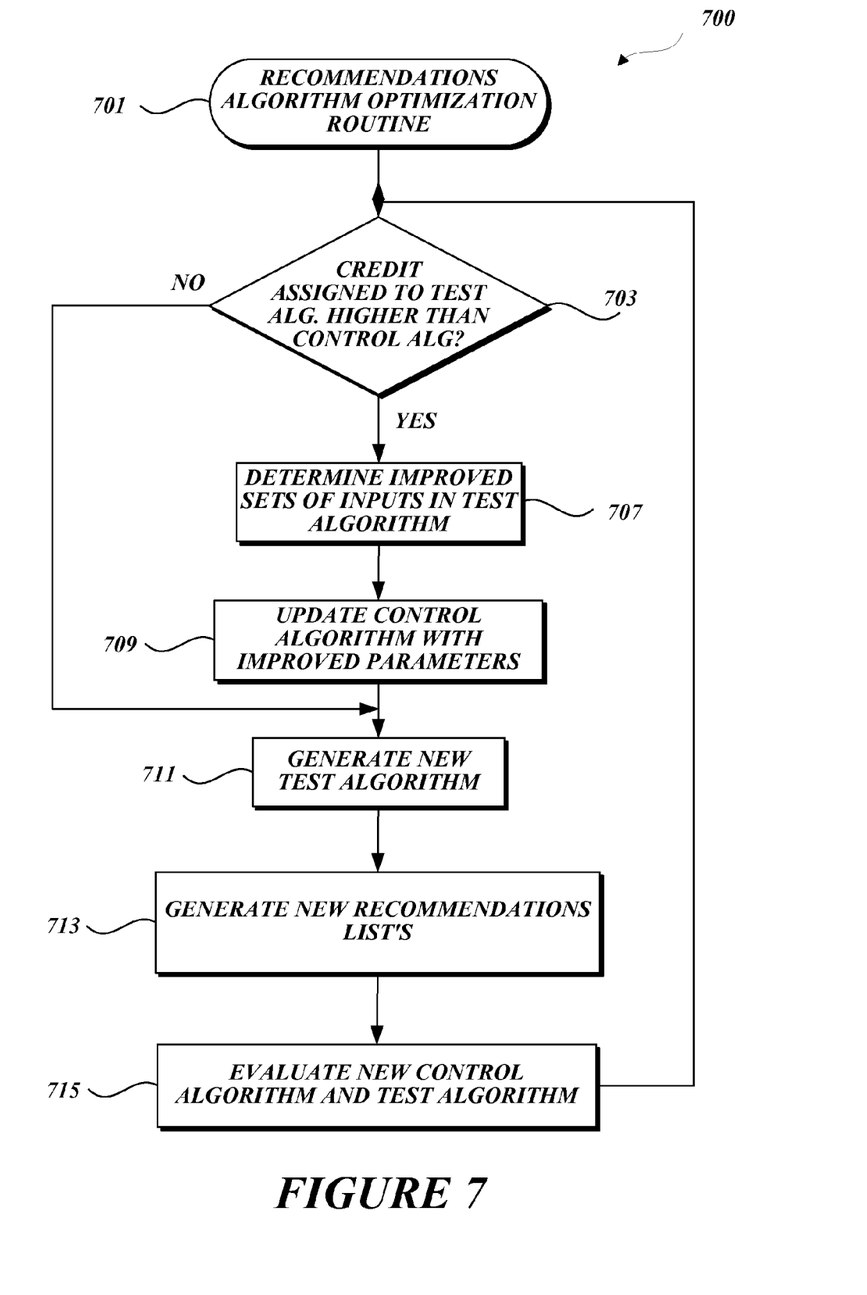
FIG. 7 is a flow diagram for optimizing a recommendations engine in accordance with one more embodiments.

FIG. 7 is a flow diagram for optimizing a recommendations engine in accordance with one more embodiments. The recommendations engine optimization routine 700 begins at block 701, and at decision block 703, a determination is made as to whether the credit value applied to the test engine is higher than the credit value to the control engine. As discussed above, as recommendations lists are provided to users, the interaction by the users with those lists is evaluated over time, and different credit values are added and/or subtracted from the control engine and test engine(s) that are used to identify items that comprise the provided recommendations lists. If it is determined at decision block 703 that the credit value applied to the test an engine is not higher than the credit value applied to the control engine, the routine 700 proceeds to block 711 and continues, as discussed below. While the example described with respect to FIG. 7 continuously generates new test engines for evaluating and optimizing the control engine, in alternative embodiments, the optimization routine 700 may complete after a specified number of evaluations, after a specific period of time, if it is repeatedly determined that the control engine generates the most accurate results, and the like.

At decision block 703, if it is determined that the credit value applied to the test engine is higher than the credit value applied to the control engine, than it can be determined, as in block 707, that an improved set of inputs used in the test engine resulted in a more accurate recommendation list of items. Accordingly, implicit or explicated weighted data values may be used in the test engine resulting in a more accurate recommendation list of items. At block 709, the control engine is updated with the improved sets of inputs determined at block 707 to generate an updated control engine. At block 711, a new test engine containing one or more sets of inputs that are different than the updated control engine is generated. At decision block 713, a new recommendations list(s) is generated. Additionally, at block 715, the new control engine and test engine(s) are evaluated. Upon completion of an evaluation time period, at block 715, the routine 700 returns to decision block 703 and continues.

It would be appreciated from the above that the recommendations list generated by the control and test engines may have a number of recommendations in common. To eliminate interference caused from the analysis of the control and test engines(s), the common items recommended by both engines may be processed separately so that comparison analysis (e.g., FIG. 7) is conducted separately on those items that are different (or clearly identifiable as being different) and/or those instances in which either the control engine or one of the test engines did not provide a result. Such differing results may be referred to as an area of difference or changes. In one embodiment, separate statistical analysis may be done for cases where only one of the control and treatment engines produced a list or where the control and treatment lists are of different lengths. Thus we can isolate quality differences between the control and treatment engines from coverage differences between the engines. Greater statistical significance may by achieved by restricting the control and treatment engines based on the engine results for a particular class of items.

Those skilled in the art may appreciate that the changes may be due to one or more engines having greater coverage (i.e., more recommendations for more of the items available) or one or more engines having too few results returned.

Engines may be further evaluated by their respective overall coverage, and performance. For example, a control engine may have less coverage, but low performance (i.e., few results), while the test engine may have less coverage, but higher performance (i.e., many results).

In yet other embodiment, a minimum coverage or performance value must be met before an engine is further considered. In other words, if it is determined that an engine has not met a threshold for overall coverage and/or performance, then the engine may be automatically removed, and placed with another engine.

In another embodiment, the system and method described above may be network service, implemented using an application program interface (API). In one embodiment, the API may allow for the transmission of the set of inputs (or input values) to be processed by various recommendation engines. In embodiment, the API may allow for testing recommendation engines in which the recommendation lists generated by two or more recommendation engines are passed to a service for comparing the results.

In yet another embodiment, a new engine may be created which uses the results from the better performing of the tested engines, when that engine has results and uses the results from the poorer performing engine otherwise. Additionally, in another embodiment, a new engine may be created that combines the benefit of both engines being compared and falling back from one to the other, if one engine did not have coverage.

The method and systems described above may also be used to recommend other types of items, including but not limited to web sites, news articles, blogs, podcasts, travel destinations, service providers, other users, events, discussion boards, photos and other images, videos, tagged items, etc. In addition, the disclosed method and system may also be used to improve search results generated by search engines.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

One skilled in the relevant art will appreciate that the methods and systems described above may be implemented by one or more computing devices, search have a memory for storing computer executable components for implementing the processes shown, for example in FIGS. 4-7, as well as a process unit for executing such components. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for evaluating recommendations, the method comprising:
   generating a first set of recommendations including a first plurality of items, wherein the first plurality of items is identified by a first technique using a first set of inputs;
   generating a second set of recommendations including a second plurality of items, wherein the second plurality of items is identified by a second technique using a second set of inputs;
   determining a first set of end user actions, wherein each of the first set of end user actions corresponds to an action taken by an end user in response to a display corresponding to at least one item of the first set of recommendations;
   determining a second set of end user actions, wherein each of the second set of end user actions corresponds to an action taken by an end user in response to a display corresponding to at least one item of the second set of recommendations; and
   associating a performance value with the first set of recommendations based at least in part on a comparison of the first set of end user actions and the second set of end user actions.

2. The computer-implemented method of claim 1, wherein the first technique and the second technique are the same.

3. The computer-implemented method of claim 1, wherein the first set of inputs and the second set of inputs are the same.

4. The computer-implemented method of claim 1, wherein each end user action is associated with a specific value, and wherein the performance value of the first set of end user actions is determined based at least in part on the sum of the specific values of each end user action of the first set of end user actions.

5. The computer-implemented method of claim 4, wherein at least one end user action is associated with a negative value.

6. A system for evaluating recommendations, the system comprising:
   one or more computing devices configured to:
      generate a first set of recommendations including a first plurality of items, wherein the first plurality of items is identified by a first technique using a first set of inputs;
      generate a second set of recommendations including a second plurality of items, wherein the second plurality of items is identified by a second technique using a second set of inputs;
      determine a first set of end user actions, wherein each of the first set of end user actions corresponds to an action taken by an end user in response to a display corresponding to at least one item of the first set of recommendations;
      determine a second set of end user actions, wherein each of the second set of end user actions corresponds to an action taken by an end user in response to a display corresponding to at least one item of the second set of recommendations; and
      associate a performance value with at least one of the first set of recommendations or the second set of recommendations based at least in part on a comparison of the first set of end user actions and the second set of end user actions.

7. The system of claim 6, wherein each end user action is associated with a specific value, and wherein the performance value is determined based at least in part on the sum of the specific values of each end user action of at least one of the first set of end user actions or the second set of end user actions.

8. The system of claim 7, wherein at least one end user action is associated with a negative value.

9. The system of claim 6, wherein the one or more computing devices are further configured to perform a responsive action based at least in part on the performance value.

10. The system of claim 9, wherein the responsive action corresponds to a selection of either the first set of recommendations or the second set of recommendations based at least in part on the performance value.

11. The system of claim 9, wherein the responsive action corresponds to modifying at least one characteristic value associated with at least one of the first technique or the second technique.

12. The system of claim 6, wherein the one or more computing devices are further configured to identify an update for at least one of the first technique or the second technique based on the performance value.

13. The system of claim 6, wherein the one or more computing devices are further configured to generate a third set of recommendations comprising one or more items from the first set of recommendations and one or more items from the second set of recommendations.

14. The system of claim 13, wherein each of the first set of end user actions corresponds to an action taken by an end user in response to the third set of recommendations.

15. The system of claim 13, wherein each of the second set of end user actions corresponds to an action taken by an end user in response to the third set of recommendations.

16. A computer-readable, non-transitory storage medium having computer-executable modules for evaluating recommendations, the computer-executable modules comprising:
a recommendation module configured to:
generate a first set of recommendations including a first plurality of items, wherein the first plurality of items is identified by a first technique using a first set of inputs;
generate a second set of recommendations including a second plurality of items, wherein the second plurality of items is identified by a second technique using a second set of inputs;
determine a first set of end user actions, wherein each of the first set of end user actions corresponds to an action taken by an end user in response to a display corresponding to an item from the first set of recommendations;
determine a second set of end user actions, wherein each of the second set of end user actions corresponds to an action taken by an end user in response to a display corresponding to an item from the second set of recommendations; and
associate a performance value with at least one of the first set of recommendations or the second set of recommendations based at least in part on a comparison of the first set of end user actions and the second set of end user actions.

17. The computer-readable, non-transitory storage medium of claim 16, wherein each end user action is associated with a specific value, and wherein the performance value is determined based at least in part on the sum of the specific values of each end user action of the set of end user actions.

18. The computer-readable, non-transitory storage medium of claim 17, wherein at least one end user action is associated with a negative value.

19. The computer-readable, non-transitory storage medium of claim 16, wherein the recommendation module is further configured to perform a responsive action based at least in part on the performance value.

20. The computer-readable, non-transitory storage medium of claim 19, wherein the responsive action corresponds to a selection of either the first set of recommendations or the second set of recommendations based at least in part on the a performance value.

21. The computer-readable, non-transitory storage medium of claim 19, wherein the responsive action corresponds to modifying at least one characteristic value associated with the first technique.

22. The computer-readable, non-transitory storage medium of claim 16, wherein the recommendation module is further configured to generate a third set of recommendations comprising one or more items from the first set of recommendations and one or more items from the second set of recommendations.

23. The computer-readable, non-transitory storage medium of claim 22, wherein each of the first set of end user actions corresponds to an action taken by an end user in response to the third set of recommendations.

24. The computer-readable, non-transitory storage medium of claim 16, wherein the recommendation module is further configured to identify an update for at least one of the first technique or the second technique based on the performance value.

* * * * *